US00RE50476E

(19) United States
(12) Reissued Patent
Wakimoto

(10) Patent Number: US RE50,476 E
(45) Date of Reissued Patent: Jul. 1, 2025

(54) IMAGE FORMING APPARATUS INCLUDING MAIN RIBS RESPECTIVELY CORRESPONDING TO SHEETS OF PLURAL SIZES AND SUB-RIB LOWER THAN MAIN RIB

(71) Applicant: KYOCERA Document Solutions Inc., Osaka (JP)

(72) Inventor: Atsuhiro Wakimoto, Osaka (JP)

(73) Assignee: KYOCERA Document Solutions Inc., Osaka (JP)

(21) Appl. No.: 17/570,131

(22) Filed: Jan. 6, 2022

Related U.S. Patent Documents

Reissue of:
(64) Patent No.: 9,857,741
Issued: Jan. 2, 2018
Appl. No.: 15/273,970
Filed: Sep. 23, 2016

(30) Foreign Application Priority Data

Oct. 9, 2015 (JP) ..... 2015-201178

(51) Int. Cl.
*G03G 15/20* (2006.01)
*G03G 15/00* (2006.01)

(52) U.S. Cl.
CPC ..... *G03G 15/2028* (2013.01); *G03G 15/6579* (2013.01); *G03G 2215/2035* (2013.01)

(58) Field of Classification Search
CPC ..... G03G 15/6573; G03G 15/2035; G03G 15/2028; G03G 2215/2035
See application file for complete search history.

(56) References Cited

U.S. PATENT DOCUMENTS 6,785,503 B2 * 8/2004 Kuo ..... G03G 15/2028 399/323
8,165,490 B2 4/2012 Yamazoe
(Continued)

FOREIGN PATENT DOCUMENTS

JP 06-035360 A 2/1994
JP H06-035360 A 2/1994
(Continued)

OTHER PUBLICATIONS

English language translation of JP2005257992A.*
English language translation of JP2004233405A.*

*Primary Examiner* — Matthew J Kasztejna
(74) *Attorney, Agent, or Firm* — Studebaker Brackett PLLC

(57) ABSTRACT

An image forming apparatus includes a fixing device, an ejection device and a conveyance guide. The fixing device is configured to fix a toner image onto a sheet. The ejection device is configured to eject the sheet having fixed toner image by the fixing device. The conveyance guide is configured to guide the sheet along a conveyance path from the fixing device to the ejection device. The conveyance guide is provided with a plurality of main ribs formed along a sheet conveyance direction so as to be located inwardly by a predetermined length from both side edges of sheets of a plurality of sizes in a sheet width direction intersecting with the sheet conveyance direction. The conveyance guide is provided with a sub-rib formed to be lower than the main ribs arranged at a space where the interval between the main ribs is wider than a predetermined interval.

11 Claims, 6 Drawing Sheets

(56) References Cited

U.S. PATENT DOCUMENTS

| | | | | |
|---|---|---|---|---|
| 2005/0089352 | A1* | 4/2005 | Lee | G03G 15/2028 399/322 |
| 2007/0231024 | A1* | 10/2007 | Inomata | G03G 15/6573 399/322 |
| 2008/0143038 | A1* | 6/2008 | Uehara | B65H 29/52 271/18 |
| 2010/0003048 | A1 | 1/2010 | Yamazoe | |
| 2010/0278574 | A1* | 11/2010 | Miyazawa | G03G 15/2028 399/400 |
| 2012/0195652 | A1* | 8/2012 | Takahashi | G03G 15/2028 399/323 |

FOREIGN PATENT DOCUMENTS

| | | | |
|---|---|---|---|
| JP | 06-118827 | A | 4/1994 |
| JP | H06-118827 | A | 4/1994 |
| JP | 2001-142331 | A | 5/2001 |
| JP | 2004233405 | * | 8/2004 |
| JP | 2005257992 | * | 9/2005 |
| JP | 2009-175663 | A | 8/2009 |

* cited by examiner

IMAGE FORMING APPARATUS INCLUDING MAIN RIBS RESPECTIVELY CORRESPONDING TO SHEETS OF PLURAL SIZES AND SUB-RIB LOWER THAN MAIN RIB

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

INCORPORATION BY REFERENCE

This application is *a reissue application under 35 U.S.C. § 251 of U.S. patent application Ser. No. 15/273,970, now U.S. Pat. No. 9,857,741, filed on Sep. 23, 2016 which is* based on and claims the benefit of priority from Japanese Patent application No. 2015-201178 filed on Oct. 9, 2015, the entire contents of which are incorporated herein by reference.

BACKGROUND

The present disclosure relates to an image forming apparatus including a fixing device fixing a toner image onto a sheet.

In an image forming apparatus, such as a copying machine, a printer and a multifunction peripheral, a sheet having a toner image fixed by a fixing device is ejected onto an ejection sheet tray by an ejecting device. Between the fixing device and the ejecting device, a conveyance guide having a guide surface guiding the sheet from the fixing device to the ejecting device is provided.

In such conveyance guide, a plurality of ribs are formed along a sheet conveyance direction in order to reduce a conveyance load of the sheet. In the case where the ribs are formed, if a position of a side edge in a width direction of the conveyed sheet is overlapped with a position of the rib, malfunction in which a side edge of the sheet comes into contact with the rib and an edge folding occurs may be caused. In order to prevent such malfunction, there is a case of forming the rib inwardly by a predetermined distance from the side edges of the sheets of a plurality of sizes.

However, if the ribs are formed so as to be shifted in the sheet width direction from the side edge of the sheet, there are places where a distance between the adjacent ribs is wide. If the distance between the adjacent ribs is wide, the sheet may tend to bend and to come into contact with a surface of the conveyance guide.

Meanwhile, in the fixing device, when the sheet passes through the fixing device, there is a case where moisture contained in the sheet is vaporized and adhered onto components around the fixing device when the sheet passes, and then, dew condensation is caused. If such dew condensation is caused on the surface of the conveyance guide, malfunction in which the sheet comes into contact with droplet, and then, wrinkles and voids in an image occurs may be caused.

Thereupon, in order to deal with such malfunction caused by the dew condensation, for example, an image forming apparatus provided with a moisture absorbing member on the components around the fixing device is known. Moreover, an image forming apparatus in which a conveyance guide is composed of a guide plate coming into contact with the sheet and a guide body supporting the guide plate and the guide plate is made of a material having thermal conductivity higher than that of the guide body is known. Further, an image forming apparatus provided with an airflow generating unit discharging air in the space around the fixing device is known.

However, if the moisture absorbing member is provided on the guide surface of the conveyance guide as mentioned above, there is a possibility that conveyance performance of the conveyance guide reduces. Still further, if the conveyance guide is composed of the guide plate and the guide body as mentioned above, a structure of the conveyance guide may be complicated. Furthermore, if the airflow generating unit is provided as mentioned above, a size of the fixing device may be enlarged and a structure thereof may be complicated.

SUMMARY

In accordance with an embodiment of the present disclosure, an image forming apparatus includes a fixing device, an ejection device and a conveyance guide. The fixing device is configured to fix a toner image onto a sheet. The ejection device is configured to eject the sheet having fixed toner image by the fixing device. The conveyance guide is configured to guide the sheet along a conveyance path from the fixing device to the ejection device. The conveyance guide is provided with a plurality of main ribs formed along a sheet conveyance direction so as to be located inwardly by a predetermined length from both side edges of sheets of a plurality of sizes in a sheet width direction intersecting with the sheet conveyance direction. The conveyance guide is provided with a sub-rib formed to be lower than the main ribs arranged at a space where the interval between the main ribs is wider than a predetermined interval.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

In the following, with reference to the drawings, an image forming apparatus according to an embodiment of the present disclosure will be described.

Figure 1:
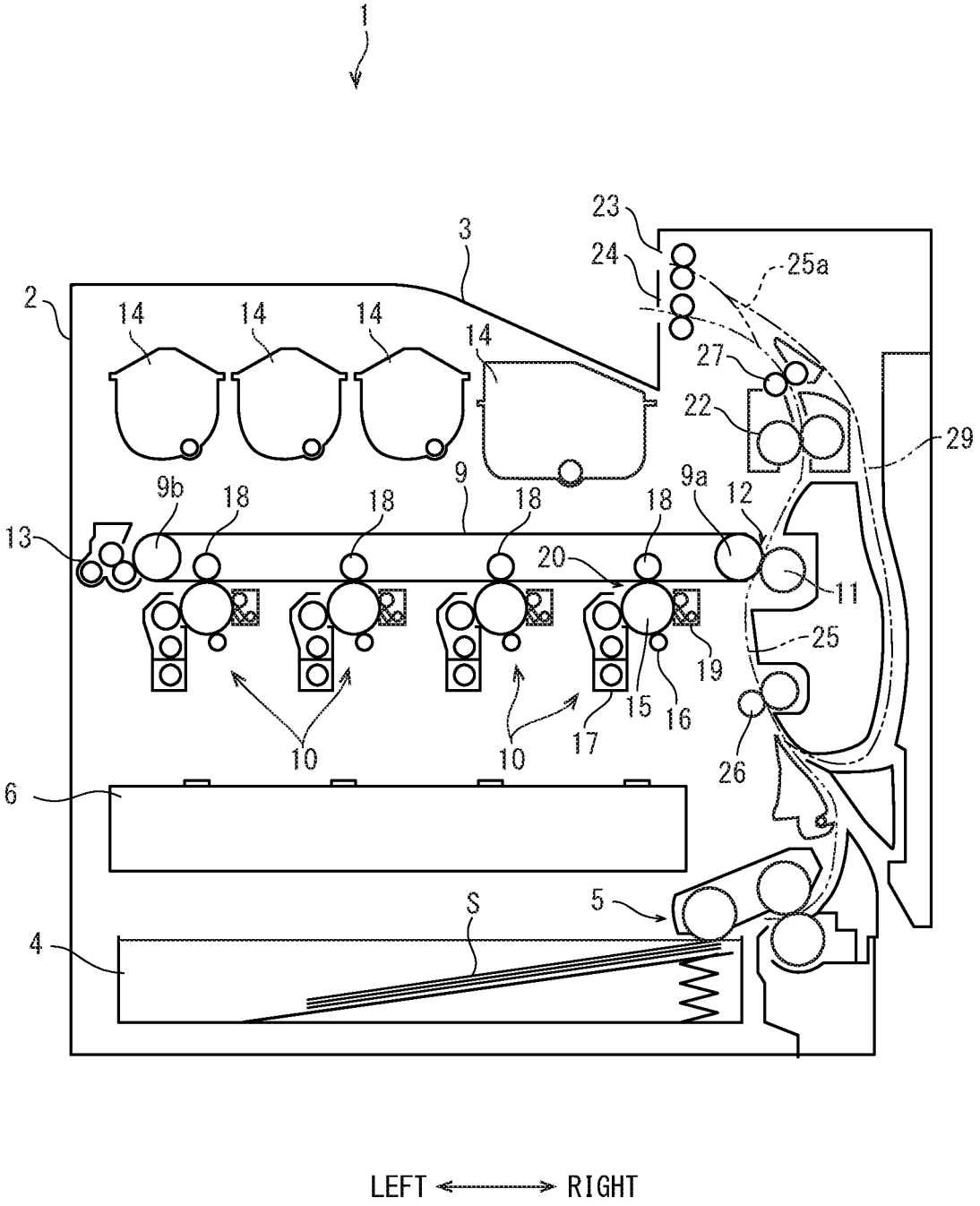
FIG. 1 is a schematic diagram schematically showing a color printer according to an embodiment of the present disclosure.

First, with reference to FIG. 1, entire structure of a color printer 1 as the image forming apparatus will be described. FIG. 1 is a sectional view schematically showing an internal structure of the color printer. Hereinafter, it will be described so that the front side of the color printer 1 is positioned at a near side on a paper sheet of FIG. 1 and that left and right directions is defined as seen from the front side of the color printer 1.

As shown in FIG. 1, the color printer 1 includes an apparatus main body 2 formed in a roughly rectangular box shape. On an upper face of the apparatus main body 2, an ejection tray 3 is formed. In a lower part of the apparatus main body 2, a sheet feeding cartridge 4 in which a sheet S is stored and a sheet feeding device 5 feeding the sheet S from the sheet feeding cartridge 4 are provided. Above the sheet feeding cartridge 4, an exposure device 6 is arranged and, above the exposure device 6, an image forming part 7 carrying out image forming in an electro-photographic manner by using four color toners is provided.

The image forming part 7 includes an intermediate transferring belt 9 rotatably supported along the left and right directions and four image forming units 10 arrayed along the left and right directions below the intermediate transferring belt 9. The intermediate transferring belt 9 is extended between a driving roller 9a and a driven roller 9b. To the driving roller 9a, a second transferring roller 11 is faced across the intermediate transferring belt 9, and then, between the intermediate transferring belt 9 and the second transferring roller 11, a second transferring part 12 is configured. To the driven roller 9b, a cleaning unit 13 is faced across the intermediate transferring belt 9. Further, above the intermediate transferring belt 9, toner containers 14 corresponding to the respective image forming units 10 are provided.

Each image forming unit 10 includes a rotatable photosensitive drum 15, and moreover, a charging device 16, a developing device 17, a first transferring roller 18 and a cleaning device 19 located along a rotating direction of the photosensitive drum 15 around the photosensitive drum 15. Between the photosensitive drum 15 and the first transferring roller 18, a first transferring part 20 is configured.

Above the second transferring part 12, a fixing device 22 is provided. Above the fixing device 22, a switchback device 23 and a ejecting device 24 are arrayed in a vertical direction so as to face to the ejection tray 3. Inside the apparatus main body 2, a conveyance path 25 is arranged so as to run from the sheet feeding device 5 to the ejecting device 24 through the second transferring part 12 the fixing device 22. On the conveyance path 25, a pair of resistance rollers 26 are located between the sheet feeding device 5 and the second transferring part 12 and a pair of conveyance rollers 27 are located between the fixing device 22 and the ejecting device 24. The conveyance path 25 is branched to a switchback path 25a extending to the switchback device 23 at a downstream side from the pair of conveyance rollers 27. The switchback path 25ais connected with a duplex printing path 29 and the duplex printing path 29 is merged with the conveyance path 25 at an upstream side from the sheet feeding device 5 in the sheet conveyance direction.

Next, an image forming operation of the color printer 1 configured as described above will be described. In each image forming unit 10, after a surface of the photosensitive drum 15 is charged by the charging device 16, exposure corresponding to image data is executed to the photosensitive drum 15 by a laser light from the exposure device 6, thereby forming an electrostatic latent image onto the surface of the photosensitive drum 15. The electrostatic latent image is developed to a toner image of a corresponding color by the developing device 17 and the toner image is first-transferred onto a surface of the intermediate transferring belt 9 in the first transferring part 20. The abovementioned operation is repeated by the respective image forming units 10 sequentially, thereby forming a full-color toner image on the surface of the intermediate transferring belt 9. Incidentally, the toner remained on the photosensitive drum 15 is removed by the cleaning device 19.

Meanwhile, the sheet S fed from the sheet feeding cartridge 4 by the sheet feeding device 5 is conveyed along the conveyance path 25 to the second transferring part 12 at synchronized timing with the abovementioned image forming operation. Then, in the second transferring part 12, the full-color toner image on the intermediate transferring belt 9 is second-transferred onto the sheet S. The toner remained on the intermediate transferring belt 9 is removed by the cleaning unit 13. The sheet S having the second-transferred toner image is conveyed to a downstream side on the conveyance path 25 to enter the fixing device 22, and then, the toner image is fixed on the sheet S in the fixing device 22. The sheet S having the fixed toner image is ejected onto the ejection tray 3 from the ejecting device 24.

When duplex printing is carried out, the sheet S in which the toner image is fixed onto one surface thereof by the fixing device 22 is conveyed through the switchback path 25a to the switchback device 23, reversed by the switchback device 23 and conveyed from the switchback path 25a to the duplex printing path 29. Subsequently, the sheet S is conveyed from the duplex printing path 29 along the conveyance path 25, another toner image is fixed onto another surface of the sheet S in the same manner, and then, the sheet S is ejected onto the ejection tray 3 from the ejecting device 24.

Figure 2:
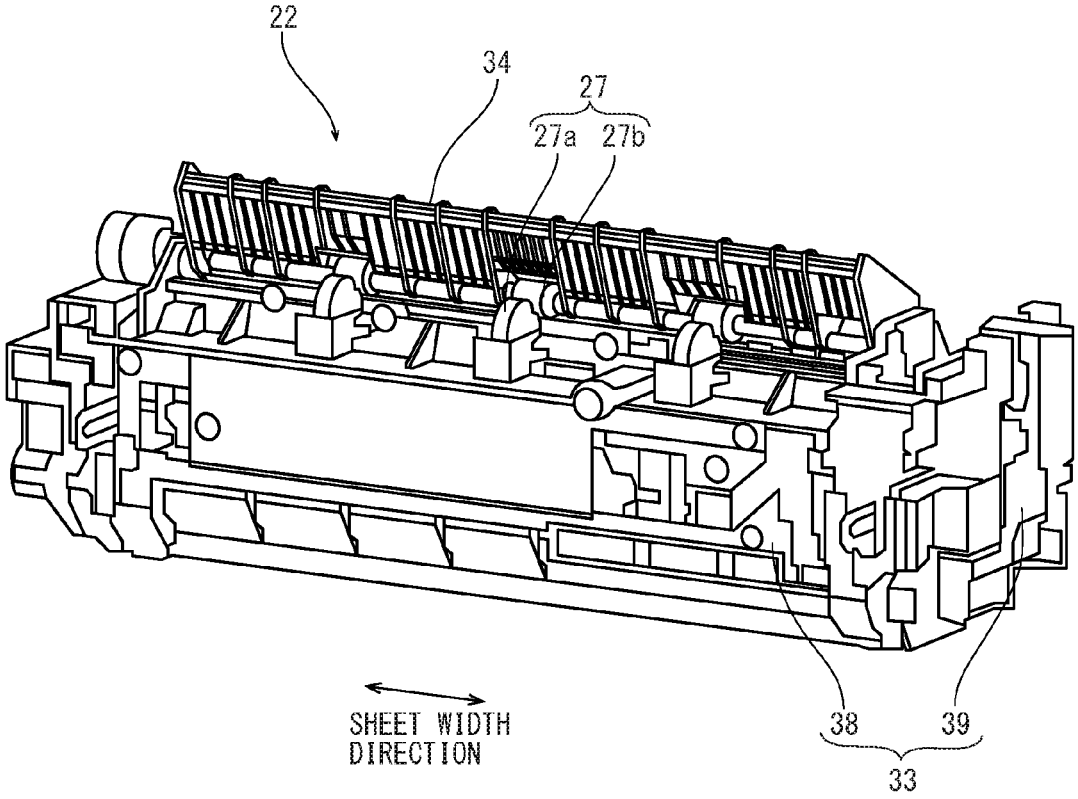
FIG. 2 is a perspective view showing a fixing device in the color printer according to the embodiment of the present disclosure.

Next, the fixing device 22 will be described with reference to FIGS. 2 and 3. FIG. 2 is a perspective view of the fixing device 22 and FIG. 3 is a sectional view of the fixing device 22.

The fixing device 22 includes a heating roller 31, a pressuring roller 32 brought into pressure contact with the heating roller 31, a fixing housing 33 supporting the heating roller 31 and the pressuring roller 32, and a conveyance guide 34 supported by the fixing housing 33.

Figure 3:
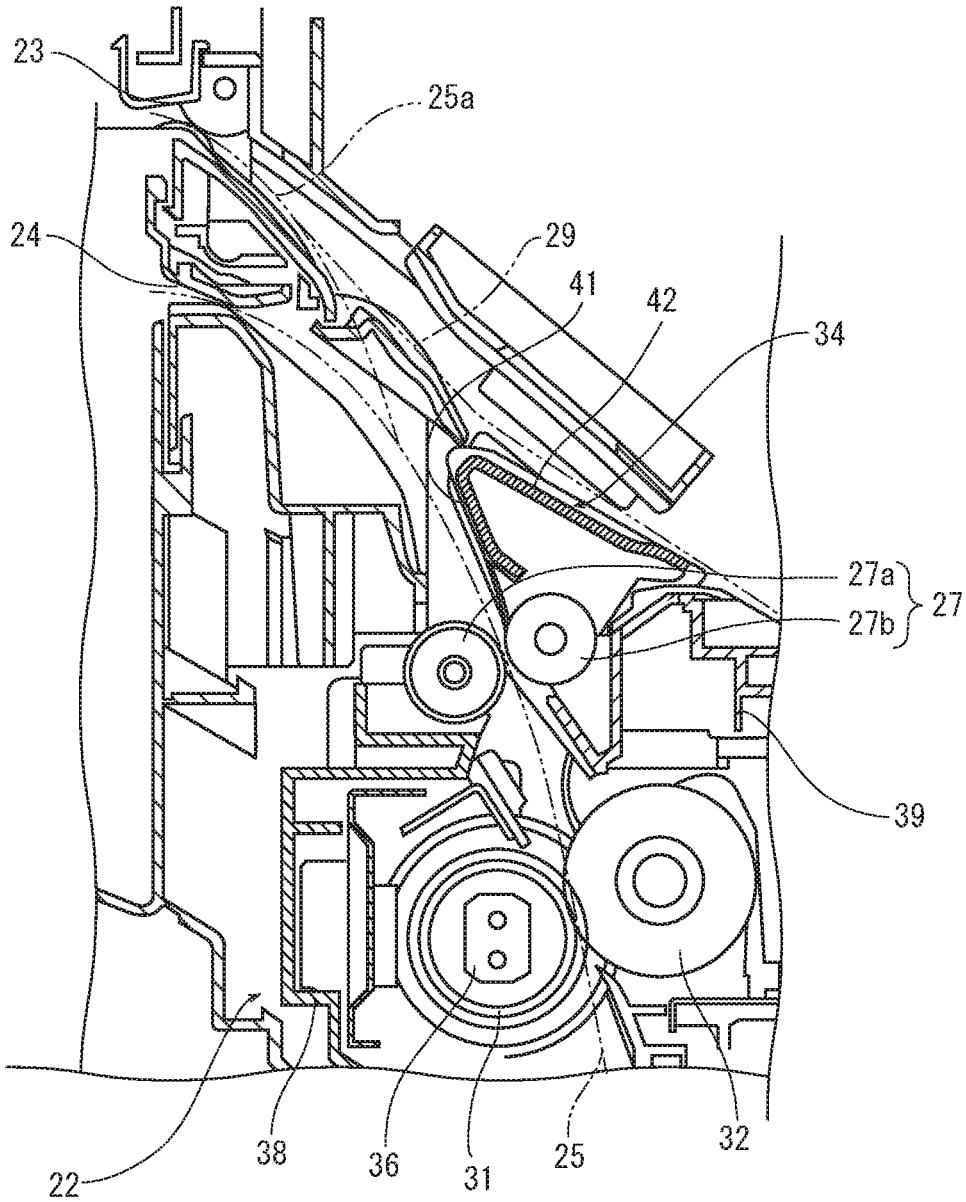
FIG. 3 is a sectional view showing the fixing device in the color printer according to the embodiment of the present disclosure.

As shown in FIG. 3, the heating roller 31 includes a cylindrical core metal and a release layer provided on an outer circumferential surface of the core metal through an adhesive layer. A heater 36 is provided inside the heating roller 31 to heat the heating roller 31 by radiating radiant heat to an inner circumferential surface of the heating roller 31. The pressuring roller 32 includes a cylindrical core metal, an elastic layer provided on an outer circumferential surface of the core metal and a release layer provided on the outer circumferential surface of the elastic layer through an adhesive layer.

The fixing housing 33 includes a heating roller housing 38 rotatably supporting the heating roller 31 and a pressuring roller housing 39 rotatably supporting the pressuring roller 32. The heating roller housing 38 and the pressuring roller housing 39 are arranged so as to face to each other across the conveyance path 25. The heating roller housing 38 is fixed to the apparatus main body 2 and the pressuring roller housing 39 is supported by the apparatus main body 2 so as to be turnable around a lower end part thereof. When the pressuring roller housing 39 is turned in a direction approaching to the heating roller housing 38, the pressuring roller 32 is brought into pressure contact with the heating roller 31 to form a fixing nip between the heating roller 31 and the pressuring roller 32. When the pressuring roller housing 39 is turned in a direction separating from the heating roller housing 38, the fixing nip is opened so that un-jamming and other process can be made.

In the heating roller housing 38, one conveyance roller 27a of the pair of conveyance rollers 27 is rotatably supported at a downstream side from the heating roller 31 in the sheet conveyance direction.

Figure 4:
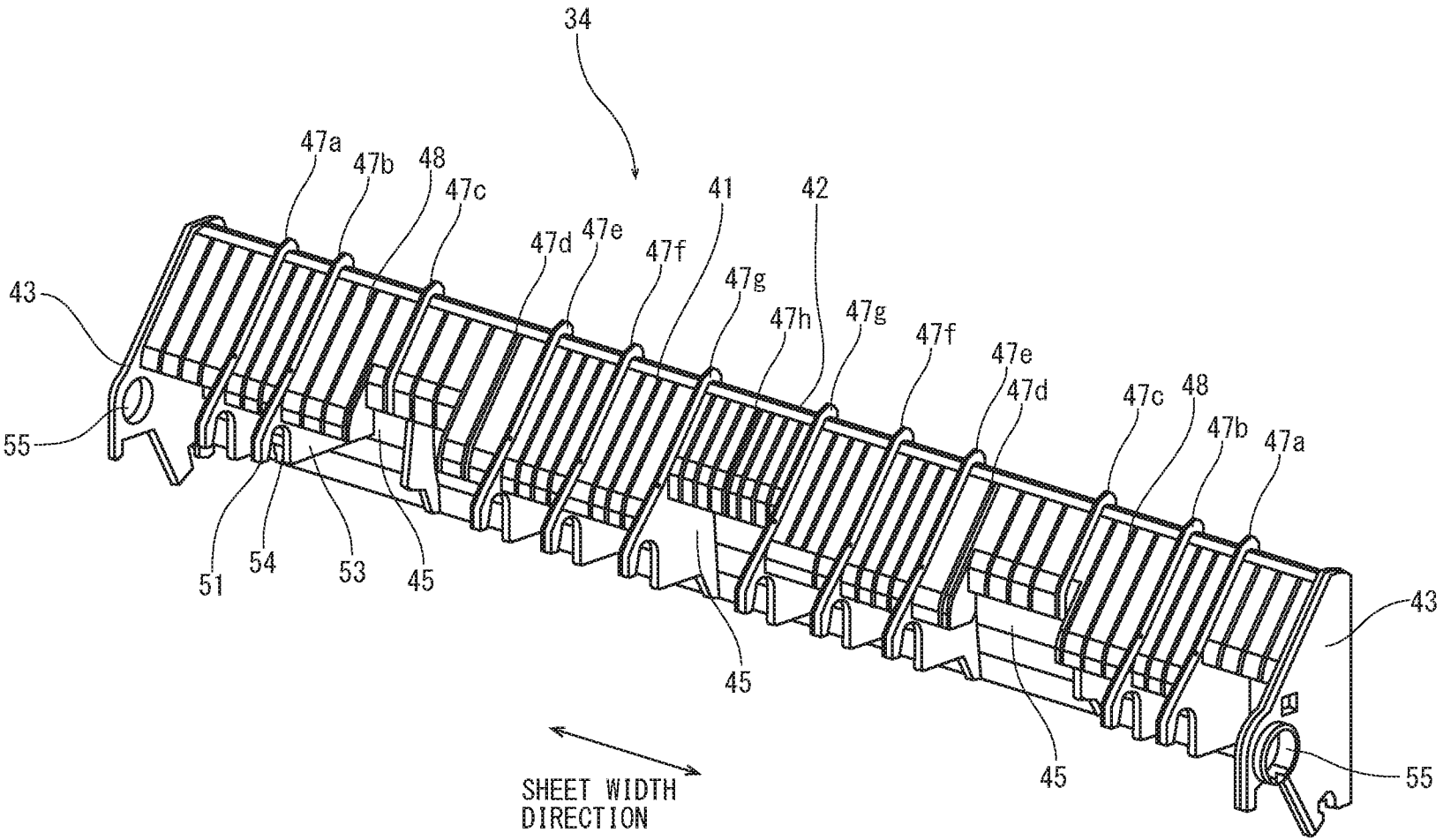
FIG. 4 is a perspective view showing a conveyance guide according to a first embodiment in the fixing device of the color printer of the embodiment of the present disclosure.
Figure 5:
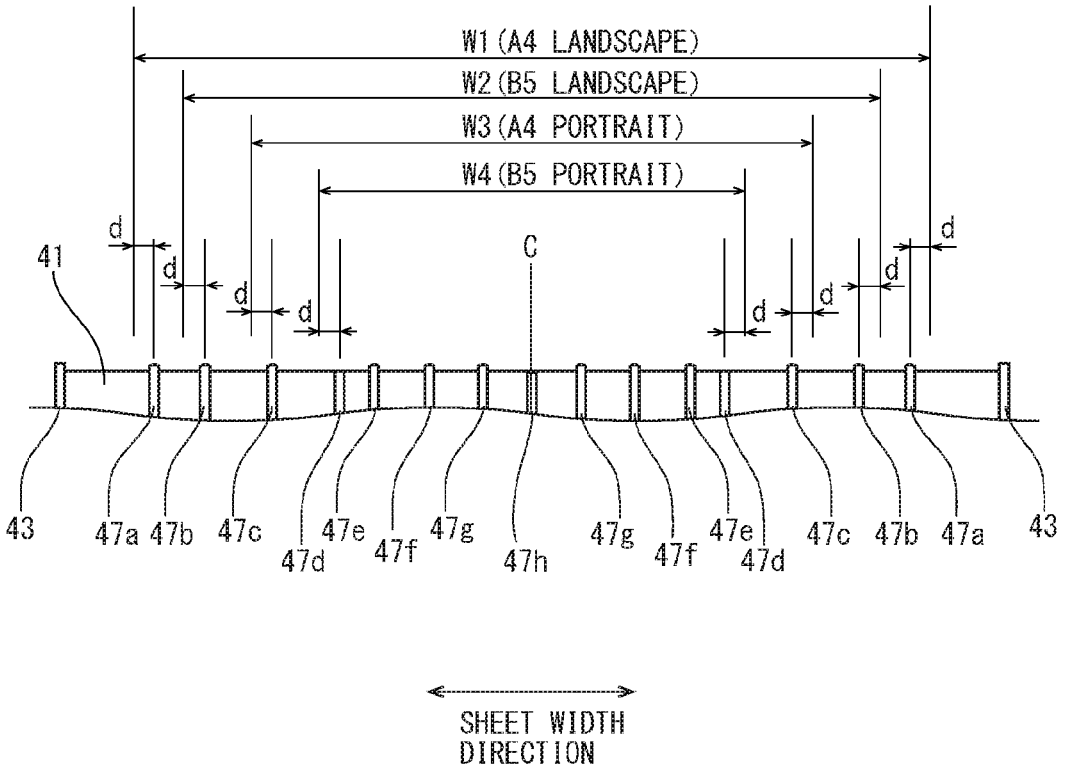
FIG. 5 is a schematic diagram useful for explaining positions of main ribs of the conveyance guide of the first embodiment in the fixing device of the color printer of the embodiment of the present disclosure.

Next, with reference to FIGS. 4 and 5, a conveyance guide 34 of a first embodiment will be described. FIG. 4 is a perspective view of the conveyance guide 34 and is a schematic diagram useful for explaining positions of ribs of the conveyance guide 34.

The conveyance guide 34 is a member having a roughly triangular section provided along the sheet width direction intersecting with the sheet conveyance direction. The conveyance guide 34 includes an inner guide plate 41 composing one guide surface of the conveyance path 25, an outer guide plate 42 composing one guide surface of the duplex printing path 29 and side plates 43 provided at both ends in the sheet width direction. The conveyance guide 34 is formed into a hollow shape so that its lower part is opened.

In the inner guide plate 41, three concaved parts 45 respectively cut away into a rectangular shape from a lower edge are formed while keeping predetermined intervals in the sheet width direction.

Further, in the inner guide plate 41, main ribs 47 and sub-ribs 48 are formed along the sheet conveyance direction of the conveyance path 25.

The main ribs 47 include a pair of first ribs 47a, a pair of second ribs 47b, a pair of third ribs 47c and a pair of fourth ribs 47d respectively formed symmetrically with respect to a center C in the sheet width direction. In addition, the main ribs 47 include a pair of fifth ribs 47e, a pair of sixth ribs 47f and a pair of seventh ribs 47g arranged from outside to inside between the pair of fourth ribs 47d and respectively formed symmetrically with respect to the center C in the sheet width direction and includes an eighth rib 47h arranged at the center C in the sheet width direction.

The pair of first ribs 47a are respectively formed inwardly by a predetermined length d from positions corresponding to both side edges of a sheet passing area W1 of an A4 size sheet conveyed in a landscape orientation. The pair of second ribs 47b are respectively formed inwardly by a predetermined length d from positions corresponding to both side edges of a sheet passing area W2 of a B5 size sheet conveyed in the landscape orientation. The pair of third ribs 47c are respectively formed inwardly by a predetermined length d from positions corresponding to both side edges of a sheet passing area W3 of the A4 size sheet conveyed in a portrait orientation. The pair of fourth ribs 47d are respectively formed inwardly by a predetermined length d of positions corresponding to both side edges of a sheet passing area W4 of the B5 size sheet conveyed in the portrait orientation. The predetermined length d is, for example, 3 mm or more.

At lower ends of the respective main ribs 47, claw parts 51 extending downwardly are formed. In the hollow part of the conveyance guide 34, reinforcing ribs 53 corresponding to the respective main ribs 47 are formed between the inner guide plate 41 and the outer guide plate 42. Between the claw parts 51 of each main rib 47 and each reinforcing rib 53, a notch 54 is formed on an axis extending in the sheet width direction. Moreover, in the respective side plates 43, shaft support holes 55 are formed coaxially with the respective notches 54.

The sub-ribs 48 are formed to be lower than the main ribs 47 and arranged at a space between the each side plate 43 and each of the pair of first ribs 47a and at a space where the interval between the main ribs 47 is wider than the predetermined interval. A difference of heights of the main rib 47 and the sub-rib 48 is, for example, 0.5 mm and the predetermined interval is, for example, 3 mm. Concretely, at a space between each side plate 43 and each of the pair of first ribs 47a, three sub-ribs 48 are formed at equal intervals. Further, at a space between each of the pair of first ribs 47a and each of the pair of second ribs 47b, two sub-ribs 48 are formed at equal intervals. At a space between each of the pair of second ribs 47b and each of the pair of third ribs 47c, three sub-ribs 48 are formed at equal intervals. At a space between each of the pair of third ribs 47c and each of the pair of fourth ribs 47d, three sub-ribs 48 are formed at equal intervals.

Still further, at a space between each of the pair of fifth ribs 47e and each of the pair of sixth ribs 47f, three sub-ribs 48 are formed at equal intervals. At a space between each of the pair of sixth ribs 47f and each of the pair of seventh ribs 47g, three sub-ribs 48 are formed at equal intervals. The interval between the adjacent sub-ribs 48 formed between each of the pair of fifth ribs 47e and each of the pair of seventh ribs 47g is narrower than the interval between the adjacent sub-ribs 48 formed between each side plate 43 and each of the pair of fourth ribs 47d.

Furthermore, at a space between each of the pair of seventh ribs 47g and the eighth rib 47h, three sub-ribs 48 are formed at equal intervals. The interval between the adjacent sub-ribs 48 formed herein is narrower than the interval of the adjacent sub-ribs 48 formed between each of the pair of fifth ribs 47e and each of the pair of seventh ribs 47g. That is, the sub-ribs 48 are formed so that the closer the main ribs at both sides of these sub-ribs 48 are to the center C in the sheet width direction, the narrower the interval between the adjacent sub-ribs 48 is.

In the outer guide plate 42, a main rib continuing from the main rib 47 formed on the inner guide plate 41 is formed along the sheet conveyance direction of the duplex printing path 29. However, no main rib continuing from the pair of fourth ribs 47d and the eighth rib 47h is formed.

To the conveyance guide 34, other conveyance roller 27b of the pair of conveyance rollers 27 is rotatably supported. The other conveyance roller 27b includes three roller parts stored respectively in the concaved parts 45 and whose rotation shaft is stored in the respective notches 54. Both ends of the rotation shaft are pivotally supported by the shaft support holes 55 of both the side plates 43.

The conveyance guide 34 thus supporting the other conveyance roller 27b is supported, as shown in FIGS. 2 and 3, by an upper part of a pressuring roller housing 39 and the other conveyance roller 27b is brought into pressure contact with the one conveyance roller 27a supported by the heating roller housing 38.

When the sheet S having the transferred toner image is conveyed to the fixing device 22 constructed as described above, the toner image is fixed to the sheet S at a transferring nip. The sheet S having the fixed toner image is conveyed by the pair of conveyance rollers 27 and guided by the inner guide plate 41 of the conveyance guide 34, and then, conveyed to the ejecting device 24 along the conveyance path 25. At this time, for example, when an A3 size sheet S is conveyed in the portrait orientation or when an A4 size sheet S is conveyed in the landscape orientation, both the side edges in the width direction of the sheet S pass inside the pair of first ribs 47a and the sheet S is conveyed mainly along the main rib 47. If the sheet S is bent between the adjacent main ribs 47, the sheet S is conveyed along the sub-ribs 48. That is, the sheet S is conveyed so that the sheet S does not come into contact with a surface of the inner guide plate 41.

In the same manner, when a B4 size sheet is conveyed in the portrait orientation or when a B5 size sheet S is conveyed in the landscape orientation, both the side edges in the width direction of the sheet S pass inside the pair of second ribs 47b and is conveyed mainly along the main rib 47. If the sheet S is bent between the adjacent main ribs 47, the sheet S is conveyed long the sub-rib 48. Moreover, when the A4 size sheet is conveyed in the portrait orientation, both the side edges in the width direction of the sheet S pass inside the pair of third ribs 47c and is conveyed mainly along the main rib 47. If the sheet S is bent between the adjacent main ribs 47, the sheet S is conveyed along the sub-rib 48. Further, when the B5 size sheet is conveyed in the portrait orientation, both the side edges in the width direction of the sheet S pass inside the pair of fourth ribs 47d and is conveyed mainly along the main rib 47. If the sheet S is bent between the adjacent main ribs 47, the sheet S is conveyed along the sub-rib 48. Thus, when the sheet S of each size is conveyed, the sheet is conveyed so that both the side edges of the sheet S pass respectively inside the main rib 47.

As described above, according to the color printer 1 of the present disclosure, since positions of both the side edges of the sheet S of each size is not overlapped with the positions of the main ribs 47 of the conveyance guide 34, it is possible to prevent from causing a situation that both the side edges of the sheet S comes into contact with the main rib 47 to be folded inside and edge folding occurs. Incidentally, while there may be a case where the both the side edges of the sheet S are overlapped with the position of the sub-rib 48, since the height of the sub-rib 48 is lower than that of the main rib 47, the side edge of the sheet S is not caught by the sub-rib 48 and the edge folding does not occur.

Moreover, even if moisture generated from the sheet S in the fixing device 22 is adhered onto the surface of the inner guide plate 41, since the sheet S is guided by the sub-rib 48 without coming into contact with the surface of the inner guide plate 41 and droplet on the surface, no image failure, such as wrinkles of the sheet S and voids in an image, may occurs.

Further, while the sheet S is tend to bend between the main ribs 47 as the sheet S is closer to the center in the sheet width direction, the sub-ribs 48 are formed so that the closer the main ribs at both sides of these sub-ribs 48 are to the center C in the sheet width direction, the narrower the interval between the adjacent sub-ribs 48 is. Accordingly, even if a center part in the width direction of the sheet is bent, the sheet S hardly comes into contact with the surface of the inner guide plate 41. Therefore, it is possible to prevent the droplet from adhering onto the sheet.

Incidentally, while no sub-rib 48 is formed on the outer guide plate 42, it is not necessary to form the sub-rib 48 on the outer guide plate 42 because almost no droplet is adhered onto the outer guide plate 42.

Still further, the difference of heights of the main rib 47 and the sub-rib 48, the length d between the main rib 47 and the side edge of the sheet, and the interval between the main ribs 47 which is a base in forming the sub-rib 48 may be appropriately changed depending on a specification and using condition of the color printer 1.

Figure 6:
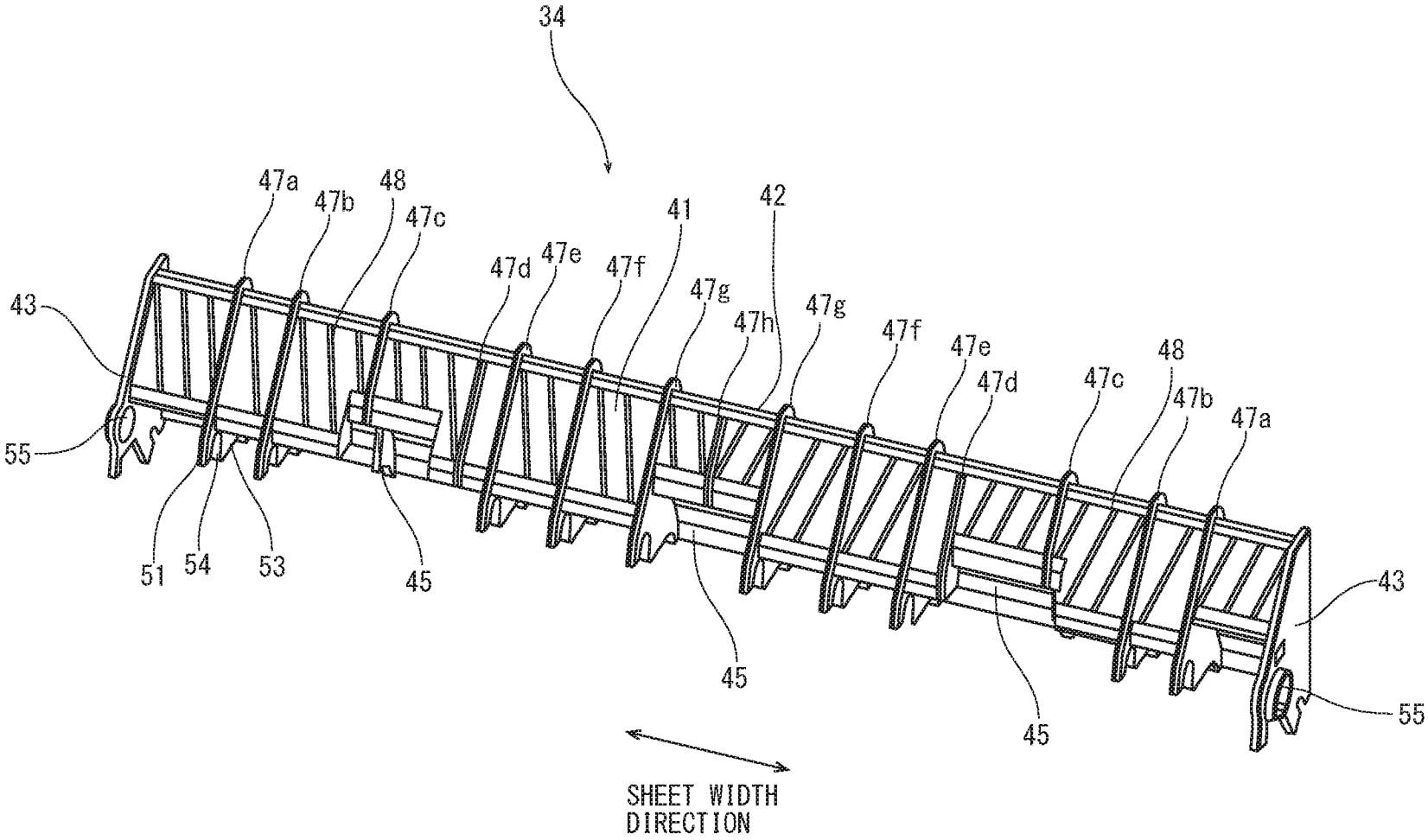
FIG. 6 is a perspective view showing a conveyance guide according to a second embodiment in the fixing device of the color printer of the embodiment of the present disclosure.

Next, with reference to FIG. 6, the conveyance guide 34 of a second embodiment will be described. FIG. 6 is a perspective view of the conveyance guide 34.

In the conveyance guide 34 of the second embodiment, the sub-ribs 48 are formed symmetrically with respect to the center C in the sheet width direction so as to be inclined to the outside in the sheet width direction toward a downstream side in the sheet conveyance direction of the conveyance path 25. An inclination angle of the sub-rib 48 with respect to the sheet conveyance direction is 45 degrees or less. Incidentally, the sub-ribs 48 are formed at equal intervals in the second embodiment.

By thus inclining the sub-ribs 48, since it is possible to reliably prevent both the side edges of the sheet S from being caught by the sub-ribs 48, it is possible to reduce a sheet conveyance load and to more stably convey the sheet S.

While cases where sheet widths of the A4 size sheet in the landscape orientation, the A4 size sheet in the portrait orientation, the B5 size sheet in the landscape orientation and the B5 size sheet in the portrait orientation are applied as the sheet widths of plurality sizes were described, other sheet widths of a sheet of 12SRA3 size (450 mm×320 mm) and a sheet of 17 Ledger size (11 inch×17 inch, nearly equal to 279 mm×432 mm) may be applied as standard. Further, the number of the sub-ribs 48 between the main ribs 47 may be appropriately changed.

The embodiment was described in a case of applying the configuration of the present disclosure to the color printer 1. On the other hand, in another embodiment, the configuration of the disclosure may be applied to another image forming apparatus, such as a copying machine, a facsimile or a multifunction peripheral, except for the color printer 1.

Further, the above-description of the embodiments was described about one example of the image forming apparatus including this according to the present disclosure. However, the technical scope of the present disclosure is not limited to the embodiments. Components in the embodiment described above can be appropriately exchanged with existing components, and various variations including combinations with other existing components are possible. The description of the embodiment described above does not limit the content of the disclosure described in the claims.

What is claimed is:

1. An image forming apparatus comprising:

a fixing device configured to fix a toner image onto a sheet;

an ejection device configured to eject the sheet having fixed toner image by the fixing device; and a conveyance guide configured to guide the sheet along a conveyance path from the fixing device to the ejection device, wherein the conveyance guide is provided with a plurality of main ribs formed along a sheet conveyance direction, the plurality of main ribs including pairs of main ribs respectively corresponding to sheets of a plurality of sizes, and the pairs of main ribs being located inwardly by a predetermined length from both side edges of the respective sheets of the plurality of sizes in a sheet width direction intersecting with the sheet conveyance direction, the conveyance guide is provided with at least one sub-rib*, the at least one sub-rib is arranged at a space between adjacent ribs of the plurality of main ribs, the at least one sub-rib is* formed to [be] *have a* lower *height* than the *adjacent ribs of the plurality of* main ribs [arranged at a space where an interval between] *and is formed to be shorter that the adjacent ribs of* the *plurality of* main ribs [is wider than a predetermined interval] *along the sheet conveyance direction and to have a downstream end position at an upstream side from a downstream end of the adjacent ribs of the plurality of main ribs in the sheet conveyance direction,*

*the conveyance guide is further provided with an edge at a downstream side in the sheet conveyance direction, and*

*a main rib, which is adjacent to the at least one sub-rib, of the plurality of main ribs has a downstream end protruded at a downstream side from the edge in the sheet conveyance direction.*

2. The image forming apparatus according to claim 1, wherein the pairs of main ribs are arranged symmetrically with respect to a center in the sheet width direction, the at least one sub-rib includes a plurality of sub-ribs, the plurality of sub-ribs are arranged symmetrically with respect to a center in the sheet width direction so as to be inclined to the outside in the sheet width direction toward a downstream side in the sheet conveyance direction.

3. The image forming apparatus according to claim 2, wherein the sub-rib is formed at an inclination angle of 45 degrees or less with respect to the sheet conveyance direction.

4. The image forming apparatus according to claim 1, wherein the conveyance guide is configured so that a plurality of the sub-ribs are provided in each of spaces between the main ribs and the plurality of sub-ribs are formed so that the closer the main ribs at both sides of these sub-ribs are to the center in the sheet width direction, the narrower the interval between the adjacent sub-ribs in the space between the main ribs is.

5. The image forming apparatus according to claim 1, wherein

[the] *each* main rib *of the plurality of main ribs* is formed on an inner guide plate along the conveyance path in the conveyance guide and is formed to continue to an outer guide plate formed along a duplex printing path in the conveyance guide.

6. The image forming apparatus according to claim 1, wherein the conveyance guide includes a shaft support hole rotatably supporting a conveyance roller conveying the sheet from the fixing device.

7. The image forming apparatus according to claim 1, wherein the conveyance guide is supported by an upper part of a pressuring roller housing rotatably supporting a pressuring roller in the fixing device.

*8. The image forming apparatus according to claim 1, wherein*

*the conveyance guide is supported by a fixing housing at the downstream side in the convevance direction from the fixing housing supporting a heating roller and a pressuring roller in the fixing device.*

*9. The image forming apparatus according to claim 1, wherein*

*the conveyance guide is provided with an inner guide plate, and*

*the edge is positioned at a downstream end of the inner guide plate in the sheet conveyance direction.*

*10. The image forming apparatus according to claim 1, wherein the edge is formed to cross the sheet convevance direction.*

*11. An image forming apparatus comprising:*

*a fixing device configured to fix a toner image onto a sheet;*

*an ejection device configured to eject the sheet having fixed toner image by the fixing device; and*

*a conveyance guide configured to guide the sheet along a conveyance path from the fixing device to the ejection device,*

*wherein the conveyance guide is provided with a plurality of main ribs formed along a sheet conveyance direction, the plurality of main ribs including pairs of main ribs respectively corresponding to sheets of a plurality of sizes, and the pairs of main ribs being located inwardly by a predetermined length from both side edges of the respective sheets of the plurality of sizes in a sheet width direction intersecting with the sheet conveyance direction,*

*the convevance guide is provided with at least one sub-rib, the at least one sub-rib is arranged at a space between adjacent ribs of the plurality of main ribs, the at least one sub-rib is formed to have a lower height than the adjacent ribs of the plurality of main ribs and is formed to be shorter than the adjacent ribs of the plurality of main ribs along the sheet conveyance direction and to have a downstream end position at an upstream side from a downstream end of the adjacent ribs of the plurality of main ribs in the sheet conveyance direction,*

*a main rib, which is adjacent to the at least one sub-rib, of the plurality of main ribs has a downstream end protruded at a downstream side from an inner guide plate or an outer guide plate of the conveyance guide in the sheet conveyance direction.*

* * * * *